S. S. AND E. F. THOMAS.
ATTACHMENT FOR HEADERS.
APPLICATION FILED APR. 10, 1919.

1,323,502.

Patented Dec. 2, 1919.

WITNESSES
R. Rousseau.

INVENTOR
S. S. Thomas & E. F. Thomas,
BY
ATTORNEYS

UNITED STATES PATENT OFFICE.

SAMUEL S. THOMAS AND ELBERT F. THOMAS, OF PAMPA, TEXAS.

ATTACHMENT FOR HEADERS.

1,323,502.  Specification of Letters Patent.  Patented Dec. 2, 1919.

Application filed April 10, 1919. Serial No. 289,118.

*To all whom it may concern:*

Be it known that we, SAMUEL S. THOMAS and ELBERT F. THOMAS, both citizens of the United States, and residents of Pampa, in the county of Gray and State of Texas, have invented certain new and useful Improvements in Attachments for Headers, of which the following is a specification.

Our invention is an improvement in attachments for headers, and has for its object to provide an attachment of the character specified, for converting a horse drawn header into a motor header.

In the drawings:—

Figures 1, 2:
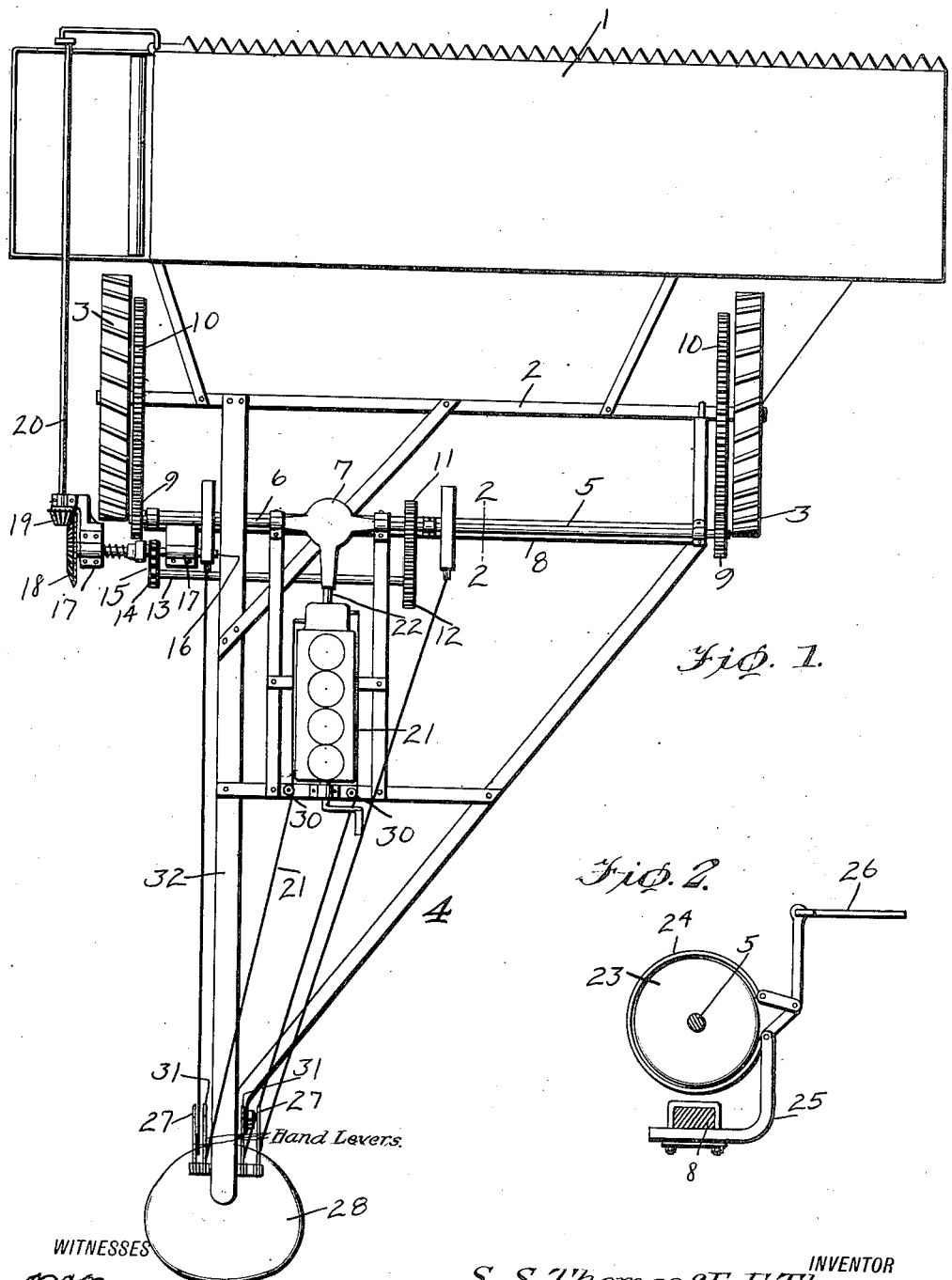
Figure 1 is a top plan view of an ordinary header with the attachment in place.
Fig. 2 is a section on the line 2—2 of Fig. 1.

The present embodiment of the invention is shown in connection with a header of the Deering or McCormick type, the header comprising the usual cutting and delivering mechanism indicated at 1, and the axle 2 having the wheels 3. The auxiliary frame 4 which extends rearwardly from the axle, is supported by the usual rudder wheel, not shown, and operated in the usual manner, the auxiliary frame being triangular, and the rudder wheel being at the apex.

The attachment comprises a differential shaft whose sections 5 and 6 are connected by a differential arranged within the differential casing 7. This shaft is journaled on a cross beam 8 supported by the auxiliary frame, and the shaft is provided at each end with a pinion 9, which meshes with a gear wheel 10 on the adjacent wheel 3.

The shaft is also provided with a pinion 11 intermediate its ends, which meshes with a pinion 12 on a countershaft 13 supported by the auxiliary frame. This countershaft has a sprocket 14 at the end remote from the pinion 12, and this sprocket 14 is connected with a sprocket 15 on a transmission shaft 16 which is journaled in bearings 17, one of which is on the beam 8, and the other supported by the main frame of the header.

The transmission shaft is provided at its outer end with a bevel gear 18, which meshes with a bevel pinion 19 on a shaft 20 connected with the operating mechanism of the header as for instance the sickle bar, the elevator, and the draper. The motor 21, in the present instance an internal combustion motor, is supported by the auxiliary frame, and the shaft 22 of the motor extends into the differential casing, and is connected with the same. Brake disks 23 are arranged on the shaft 5, on opposite sides of the differential, and each wheel or disk 23 is encircled by a band 24, and these bands are supported by brackets 25 from the beam 8. The bands are controlled by links 26, which are connected with controlling levers 27 on the platform 28 at the rudder wheel, and by means of these levers, either band may be tightened upon the adjacent shaft section, to fix the said section or to brake the action of the same.

The motor is controlled from the platform 28, by means of flexible members 21 which are connected with the controls of the motor, and which pass over pulleys 30 on the auxiliary frame to the platform, and to suitable controlling levers 31 mounted on the platform.

In attaching the attachment to a header, the only changes required are the addition of the gear wheels 10. The remaining mechanism is carried by the auxiliary frame, which is supported by the axle, and by the bar 32 which carries the rudder wheel, and which is found in the usual header, extending rearwardly from the axle.

In use, the motor drives the axle sections from the transmission, and also drives the operating mechanism of the header through the transmission shaft 16. In turning, when it is desired to turn a square corner, to the right for instance, the section 5 of the drive shaft is braked by the lever pertaining thereto, the other section 6 being permitted to run free. The wheel 3 at the left will run around the wheel 3 at the right, making the turn, the rudder wheel assisting in turning. If desired, in making a right hand turn, the shaft section 6 may be fixed and the shaft section 5 may be reversed.

We claim:—

1. A motor attachment for headers, comprising an auxiliary frame for attachment to the main frame of the header, said auxiliary frame carrying a motor and a sectional shaft whose sections are connected to each other and to the motor shaft by a differential connection, a driving connection between the motor and a transmission shaft for the header mechanism, and means for braking either shaft section, said means comprising a brake disk on each section, a band coöperating with each disk, and means for operating each band from the rear of the header, and means for operating the controlling mechanism of the motor from the rear end of the auxiliary frame.

2. A motor attachment for headers comprising an auxiliary frame carrying a motor and adapted for attachment to the main frame of the header, said auxiliary frame carrying a sectional shaft whose sections are connected to each other and to the motor by a differential connection, means supported by the frame for connecting the motor to a transmission shaft of the header mechanism, and means for braking either shaft section.

SAMUEL S. THOMAS.
ELBERT F. THOMAS.

Witnesses:
I. E. DUNCAN,
C. VOLLMERT.